(12) United States Patent
Sobel et al.

(10) Patent No.: US 7,650,382 B1
(45) Date of Patent: Jan. 19, 2010

(54) DETECTING SPAM E-MAIL WITH BACKUP E-MAIL SERVER TRAPS

(75) Inventors: William E Sobel, Stevenson Ranch, CA (US); Bruce McCorkendale, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1095 days.

(21) Appl. No.: 10/425,123

(22) Filed: Apr. 24, 2003

(51) Int. Cl.
*G06F 15/173* (2006.01)
*G06F 15/16* (2006.01)

(52) U.S. Cl. ............... 709/206; 709/207; 709/201; 709/223; 709/224; 709/229; 713/163

(58) Field of Classification Search ......... 709/204–209, 709/219, 201, 245, 228, 224, 223; 715/531, 715/530; 707/3, 6, 100
See application file for complete search history.

(56) References Cited

U.S. PATENT DOCUMENTS

| | | | |
|---|---|---|---|
| 5,675,710 A | 10/1997 | Lewis | |
| 5,826,249 A | 10/1998 | Skeirik | |
| 6,023,723 A | 2/2000 | McCormick et al. | |
| 6,052,709 A | 4/2000 | Paul | |
| 6,072,942 A | 6/2000 | Stockwell et al. | |
| 6,161,130 A | 12/2000 | Horvitz et al. | |
| 6,167,434 A | 12/2000 | Pang | |
| 6,249,807 B1 | 6/2001 | Shaw et al. | |
| 6,253,169 B1 | 6/2001 | Apte et al. | |
| 6,282,565 B1 | 8/2001 | Shaw et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch et al. | |
| 6,397,215 B1 | 5/2002 | Kreulen et al. | |
| 6,421,709 B1 * | 7/2002 | McCormick et al. | ........ 709/206 |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,487,586 B2 | 11/2002 | Ogilvie et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1 | 4/2003 | Kirsch | |

(Continued)

OTHER PUBLICATIONS

Wikipedia.org web pages (online). Wikipedia (retrieved Mar. 17, 2003). Retrieved from the Internet: <URL: http://www.wikipedia.org/w/wiki.phtml?title= Machine learning & printable=yes>.

(Continued)

*Primary Examiner*—Jude J Jean Gilles
(74) *Attorney, Agent, or Firm*—Fenwick & West LLP

(57) ABSTRACT

A domain (101) has a primary e-mail server (103) with an e-mail delivery address (109), and at least one backup e-mail server (105) with an e-mail delivery address (111). A trap manager (115) adds at least one trap e-mail delivery address (113) to an e-mail delivery address list (107) associated with the domain (101), the trap e-mail delivery address (113) resembling a backup e-mail server delivery address (111) and pointing to the trap manager (115). The trap manager (115) receives (201) e-mail sent to the trap address (113), and determines whether received e-mail comprises spam (119).

22 Claims, 12 Drawing Sheets

U.S. PATENT DOCUMENTS

| | | |
|---|---|---|
| 6,640,301 B1 | 10/2003 | Ng |
| 6,643,685 B1 | 11/2003 | Millard |
| 6,650,890 B1 | 11/2003 | Irlam et al. |
| 6,654,787 B1 | 11/2003 | Aronson et al. |
| 6,687,740 B1 | 2/2004 | Gough |
| 6,691,156 B1 | 2/2004 | Drummond et al. |
| 6,697,942 B1 | 2/2004 | L'Heureux |
| 6,701,347 B1 | 3/2004 | Ogilvie |
| 6,711,608 B1 | 3/2004 | Ogilvie |
| 6,732,157 B1 | 5/2004 | Gordon et al. |
| 6,757,713 B1 | 6/2004 | Ogilvie et al. |
| 6,757,830 B1 | 6/2004 | Tarbotton et al. |
| 6,779,021 B1 * | 8/2004 | Bates et al. ............... 709/206 |
| 7,054,906 B2 * | 5/2006 | Levosky ................... 709/206 |
| 2002/0038308 A1 | 3/2002 | Cappi |
| 2002/0087649 A1 | 7/2002 | Horvitz |
| 2002/0138525 A1 | 9/2002 | Karadimitriou et al. |
| 2002/0147694 A1 | 10/2002 | Dempsey et al. |
| 2002/0147782 A1 | 10/2002 | Dimitrova et al. |
| 2002/0199095 A1 * | 12/2002 | Bandini et al. ............ 713/151 |
| 2002/0199186 A1 | 12/2002 | Ali et al. |
| 2002/0199194 A1 | 12/2002 | Ali |
| 2003/0033587 A1 | 2/2003 | Ferguson et al. |
| 2003/0149726 A1 | 8/2003 | Spear |
| 2003/0191969 A1 * | 10/2003 | Katsikas ................... 713/201 |
| 2003/0200334 A1 | 10/2003 | Grynberg |
| 2003/0220978 A1 | 11/2003 | Rhodes |
| 2003/0229672 A1 | 12/2003 | Kohn |
| 2003/0233415 A1 | 12/2003 | Beyda |
| 2004/0003283 A1 | 1/2004 | Goodman et al. |
| 2004/0024823 A1 | 2/2004 | Del Monte |
| 2004/0054887 A1 | 3/2004 | Paulsen et al. |
| 2004/0064734 A1 | 4/2004 | Ehrlich |
| 2004/0068534 A1 | 4/2004 | Angermayr et al. |
| 2004/0073617 A1 | 4/2004 | Milliken et al. |
| 2004/0093383 A1 | 5/2004 | Huang et al. |
| 2004/0093384 A1 | 5/2004 | Shipp |
| 2004/0111480 A1 | 6/2004 | Yue |

OTHER PUBLICATIONS outlook.spambully.com web pages [online]. Spam Bully [retrieved Jan. 16, 2003]. Copyright 2002. Retrieved from the Internet: <URL: http://outlook.spambully.com/about.php >.

cauce.org web pages [online]. Coalition Against Unsolicited Commercial Email [retrieved Mar. 17, 2003]. Retrieved from the Internet: <URL: http://www.cauce.org/about/problem.shtml>.

CAUCE.org *web pages [online] Coalition Against Unsolicited Commercial Email [retrieved Mar. 17, 2003] Retrieved from the Internet*: <URL: http://www.cauce.org/about/problem.shtml>.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

NBEC/NWOCA Anti-Spam Tools, [online] [retrieved Jul. 7, 2004] retrieved from http://home.nwoca.org, Jul. 7, 2004.

Kularski, C. "Compound Procedures for Spam Control," Highland School of Technology, Jan. 2004.

"Technical Responses to Spam," Nov. 2003, Taughannock Networks.

* cited by examiner

DETECTING SPAM E-MAIL WITH BACKUP E-MAIL SERVER TRAPS

TECHNICAL FIELD

This invention pertains to detecting spam e-mail.

BACKGROUND ART

Spam e-mail is a significant and growing nuisance. As used herein, "spam" is any unsolicited e-mail, i.e. email that is sent to a computer user without the user's consent.

When legitimate e-mail is sent to a given domain, the originating e-mail system sends the e-mail to the primary e-mail server for that domain. The domain can also have at least one backup e-mail server. A backup e-mail server should receive e-mail only when the primary e-mail server is unreachable by an e-mail sender. Some senders of spam have realized that backup e-mail servers are sometimes not as well secured as primary e-mail servers. Whereas a primary e-mail server might have a filter or other mechanism installed to detect incoming spam, backup servers are sometimes more vulnerable. Additionally, primary e-mail servers are sometimes configured to accept all incoming e-mail originating from one of their backup e-mail servers. Thus, backup e-mail servers are viewed as a good target by many senders of spam, who often send their spam directly to a backup e-mail server in an attempt to bypass the security of the primary e-mail server. What is needed are methods, computer readable media and systems to detect such attempts.

DISCLOSURE OF INVENTION

The present invention comprises methods, systems, and computer readable media for detecting spam e-mail (119) received by a domain (101), the domain (101) having a primary e-mail server (103) with an e-mail delivery address (109) and at least one backup e-mail server (105) with an e-mail delivery address (111). In some embodiments, a trap manager (115) adds at least one trap e-mail delivery address (113) to an e-mail delivery address list (107) associated with the domain (101), the trap e-mail delivery address (113) resembling a backup e-mail server delivery address (111) and pointing to the trap manager (115). The trap manager (115) receives (201) e-mail sent to the trap address (113), and determines whether received e-mail comprises spam (119).

The features and advantages described in this summary and in the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1A:
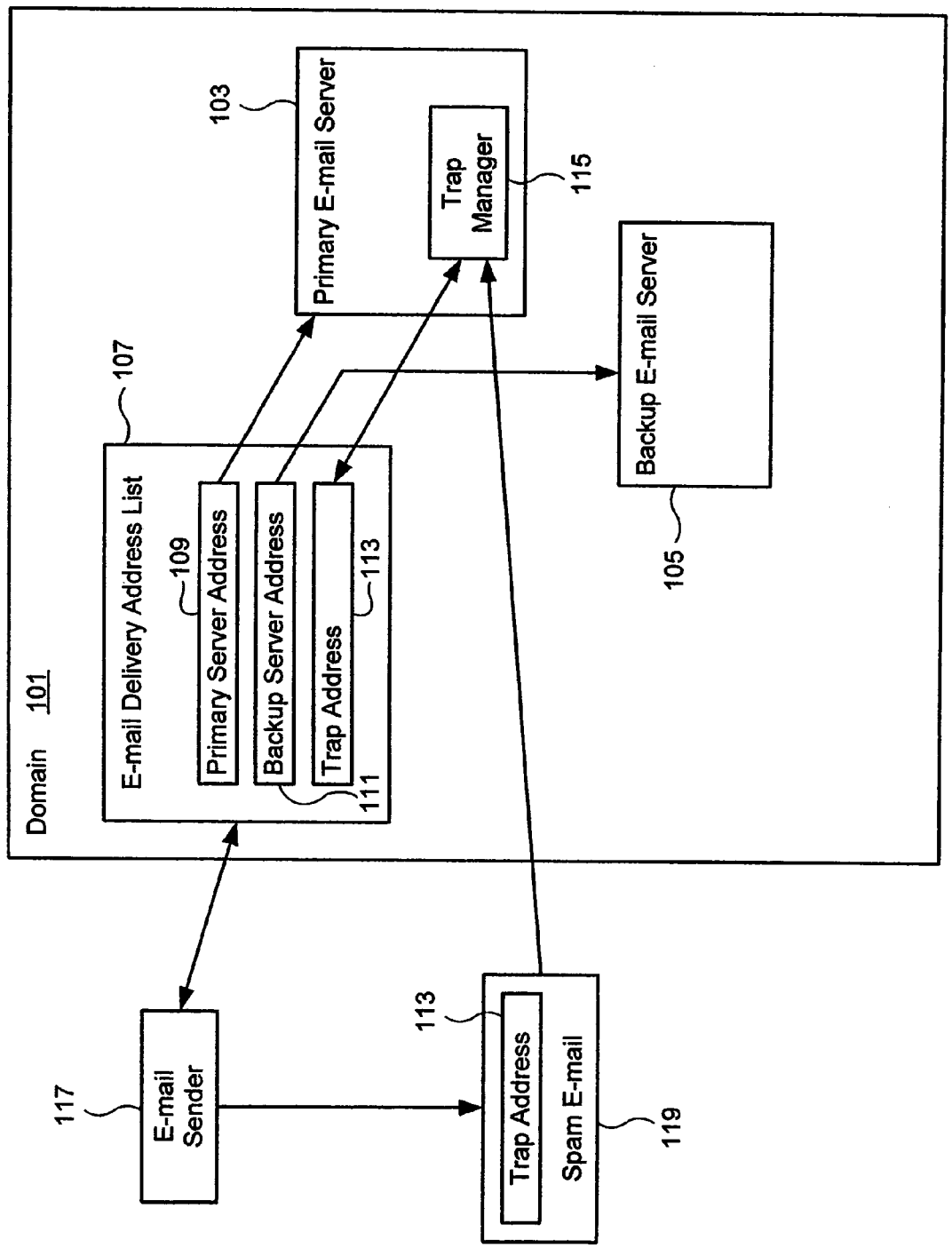
FIG. 1a is a block diagram illustrating a high level overview of one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

FIG. 1 is a block diagram illustrating a high level overview of one embodiment of the present invention. As illustrated in FIG. 1, a domain 101 includes a primary e-mail server 103 and a backup e-mail server 105. Although only one backup e-mail server 105 is illustrated, it is to be understood that a domain 101 can include multiple backup e-mail servers 105. The domain 101 also includes an e-mail delivery address list 107. It will be readily understood by those of ordinary skill in the relevant art that although the address list 107 is illustrated as a single object for clarity, any type of internal format is within the scope of the present invention. The word "list" is used for readability, but as used herein indicates only that the delivery addresses of the various e-mail servers of a domain 101 are accessible in some type of format, and not that the domain 101 necessarily include a single, discrete entity that includes this data. As those of ordinary skill in the relevant art will readily understand, within the context of Domain Name System (DNS), the e-mail delivery address list 107 would comprise the Mailer Exchange (MX) records for the domain 101. Of course, the present invention is not limited to DNS.

The e-mail delivery address list 107 includes an e-mail server delivery address for each e-mail server of the domain 101. For example, as illustrated in FIG. 1, a primary server delivery address 109 points to the primary e-mail server 103 and a backup server delivery address 111 points to the backup e-mail server 105. The address list 107 also includes a trap e-mail delivery address 113 which points to a trap manager 115.

Figure 1B:
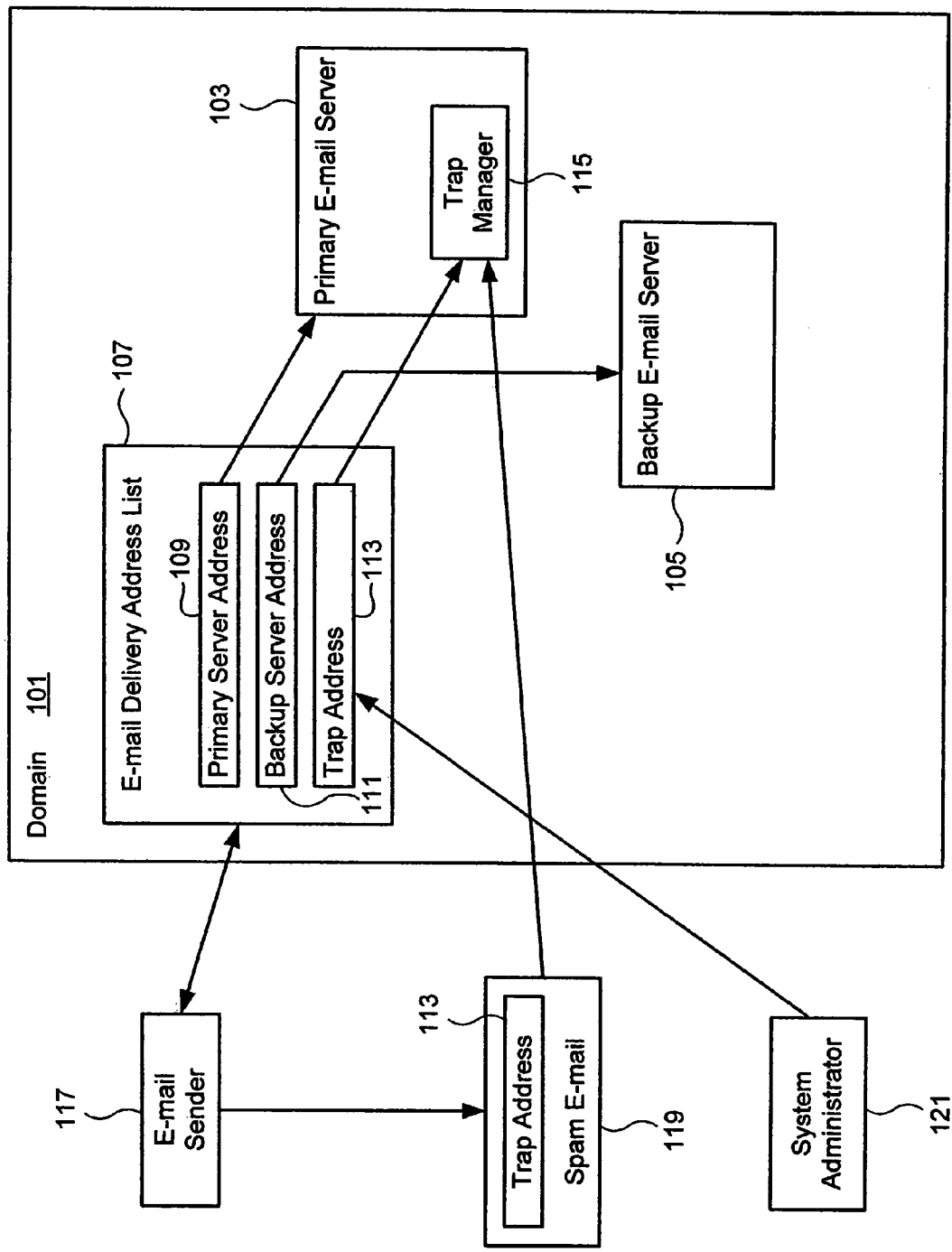
FIG. 1b is a block diagram illustrating a high level overview of one embodiment of the present invention.

As explained in greater detail below, the trap manager 115 detects spam e-mail 119 sent to a backup e-mail server 105. At least one trap address 113 is added to the e-mail delivery address list 107. In some embodiments, the trap manager 115 adds the trap address(es) 113 to the e-mail delivery address list 107, as illustrated in FIG. 1a. In other embodiments, trap address(es) 113 are added to the e-mail delivery address list 107 manually, for example by a system administrator 121, as illustrated in FIG. 1b. Whenever this specification discusses a trap manager 115 adding a trap address 113 to the e-mail delivery address list 107, it is to be understood that in another embodiment the addition can be performed manually. The trap address 113 is added so that it appears to be a backup server e-mail delivery address 111. The exact mechanisms for adding a trap address 113 that appears to be a backup e-mail server address 111 will be readily apparent to one of ordinary skill in the art, and will vary from embodiment to embodiment. For example, as those of ordinary skill in the relevant art will know, in DNS the MX record of the primary e-mail server 103 always has the lowest preference number, whereas MX records of backup e-mail servers 105 have higher preference numbers. Thus, the trap manager 115 can list the trap address 113 as having a higher preference number than the primary e-mail server address 109 (for example, the trap address 113 can be given the highest preference number), so as to make the trap address 113 appear to be the e-mail delivery address of a backup e-mail server 105.

An e-mail sender 117 attempts to send spam e-mail 119 to the domain 101. The e-mail sender 117 uses conventional techniques to read the e-mail delivery address list 107 associated with the domain 101 (e.g., the e-mail sender 117 can execute a DNS lookup). The e-mail sender 117 attempts to identify a backup server e-mail delivery address 112 in order to send spam e-mail 119 to the domain 101 through the backup e-mail server 105. Because the trap address 113 resembles a backup e-mail server address 111, the e-mail sender 117 sends spam e-mail 119 to the trap address 113. The e-mail is received by the trap manager 115, which determines whether it is spam 119, as described in detail later in this specification.

In the embodiment illustrated in FIG. 1, the trap manager 115 is associated with the primary e-mail server 103. In other embodiments, the trap manager 115 is associated with a non-primary e-mail server, as discussed below. FIG. 1 illustrates the trap manager 115 as being a component of the primary e-mail server 103. As will be apparent to those of ordinary skill in the relevant art, in other embodiments in which the trap manager 115 is associated with the primary e-mail server 103, the trap manager 115 can be implemented in other ways, for example as a plug-in to the primary e-mail server 103, or as a transparent proxy installed in front of the primary e-mail server 103. It is to be understood that even in embodiments in which the trap manager 115 is associated with the primary e-mail server 103, the trap address 113 is distinct from the primary server e-mail delivery address 109, so that the trap address 113 will resemble a backup server e-mail delivery address 111. Various techniques known to those of skill in the art can be used to route e-mail addressed to the trap address 113 to the primary e-mail server 103 for processing by the trap manager 115. Examples of such techniques will be readily apparent to those of ordinary skill in the relevant art and include but are not limited to multi-homed systems, router configuration and firewall configuration.

Figure 2:
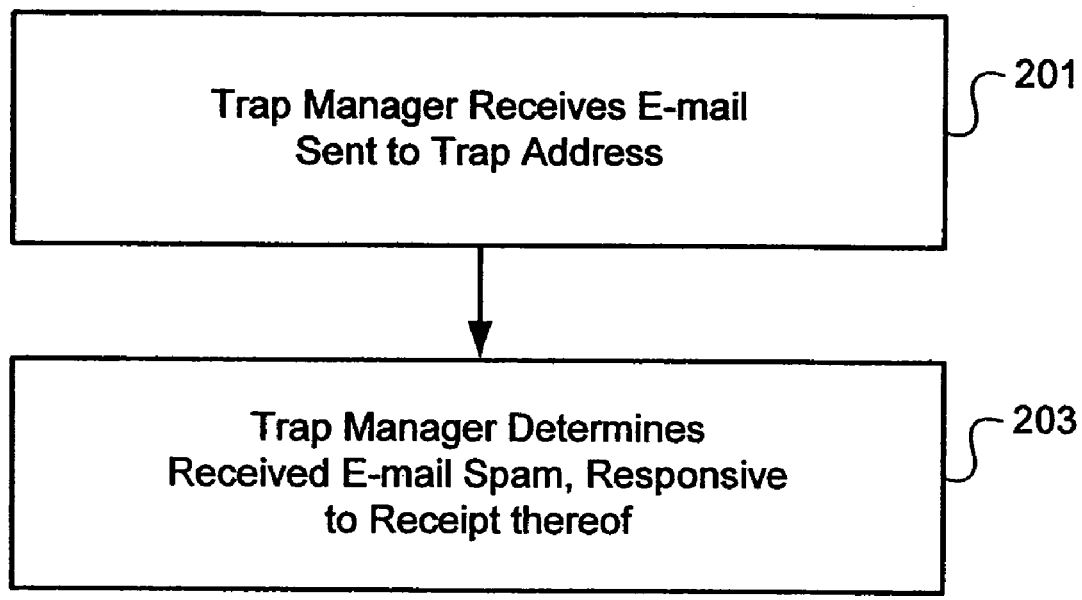
FIG. 2 is a flowchart illustrating steps for a trap manager to determine that received e-mail comprises spam, according to one embodiment of the present invention.

FIG. 2 illustrates steps for a trap manager 115 to determine that received e-mail comprises spam 119, according to one embodiment of the present invention. The trap manager 115 receives 201 e-mail sent to the trap address 113. The trap manager 115 determines 203 that the received e-mail comprises spam 119 responsive to the receipt thereof. Recall that the trap address 113 resembles a backup server address 111, and thus e-mail received by the trap manager 115 was presumably intended for a backup e-mail server 105. If the primary e-mail server 103 is not reachable by an e-mail sender 117, it would be expected that legitimate e-mail would be routed to backup e-mail server addresses 111, and hence also to the trap address 113. However, if primary e-mail server 103 is reachable by an e-mail sender 117, legitimate e-mail should not be routed to the trap manager 115, and thus received e-mail would be suspected as spam 119. In embodiments where the trap manager 115 is associated with the primary e-mail server 103, when the trap manager 115 receives e-mail, the trap manager can assume that the primary e-mail server 103 is reachable. Thus, the receipt of the e-mail by the trap manager 115 indicates than an e-mail sender 117 attempted to send e-mail to a backup e-mail server 105 when the primary e-mail server 103 was reachable, indicating that the e-mail is suspected to be spam 119. Therefore, in some of these embodiments the trap manager 115 determines 203 that received e-mail comprises spam 119, responsive to the trap manager 115 having received it.

Figure 3:
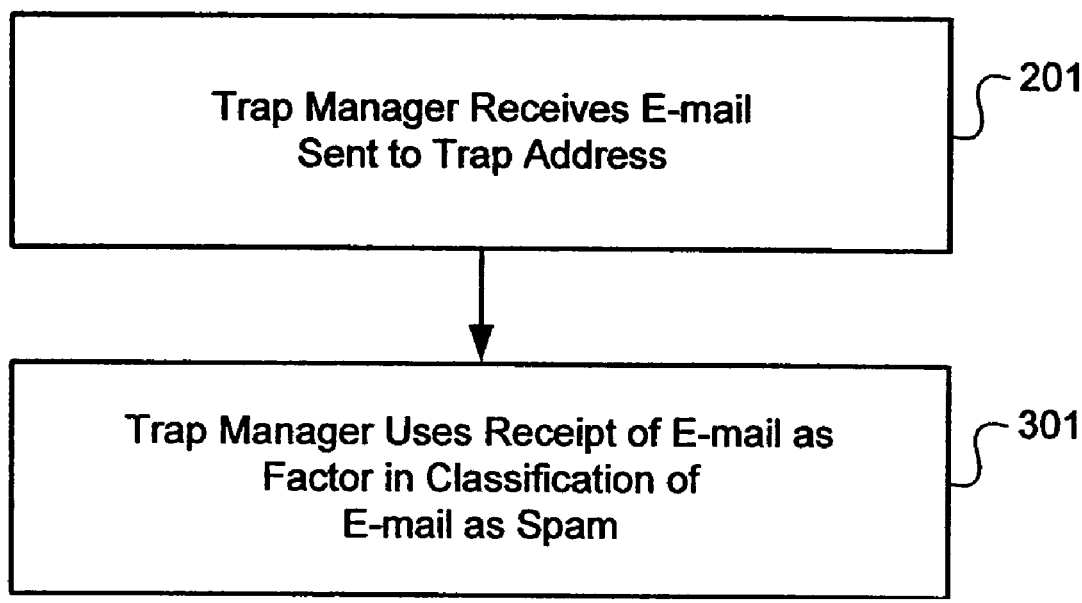
FIG. 3 is a flowchart illustrating steps for a trap manager to determine that received e-mail comprises spam, according to another embodiment of the present invention.

FIG. 3 illustrates steps for a trap manager 115 to determine that received e-mail comprises spam 119, according to another embodiment of the present invention. The trap manager 115 receives 201 e-mail sent to the trap address 113. Rather than simply determining 203 that the received e-mail comprises spam 119 responsive to the receipt thereof, the trap manager uses 301 the receipt of the e-mail as one factor in a classification of the e-mail as spam 119. Even though a backup e-mail server 105 should receive e-mail only when the primary e-mail server 103 is unreachable, in some embodiments it is assumed that sometimes a backup e-mail server 105 will receive some legitimate e-mail even when the primary e-mail server 103 is reachable. In such embodiments, the receipt of the e-mail by the trap manager 115 is used as one factor in a heuristic analysis of the received e-mail, in order to classify it as spam 119 or legitimate e-mail. The receipt of the e-mail by the trap manager indicates that spam 119 is suspected, but without the presence of at least one other suspicious factor (e.g., a suspect subject line, suspect word(s) or other content, suspect point of origin) the e-mail will not be classified as spam 119. What other factors to consider, and how aggressive to be in the classification of received e-mail as spam 119, are design variables that vary from embodiment to embodiment.

Figure 4:
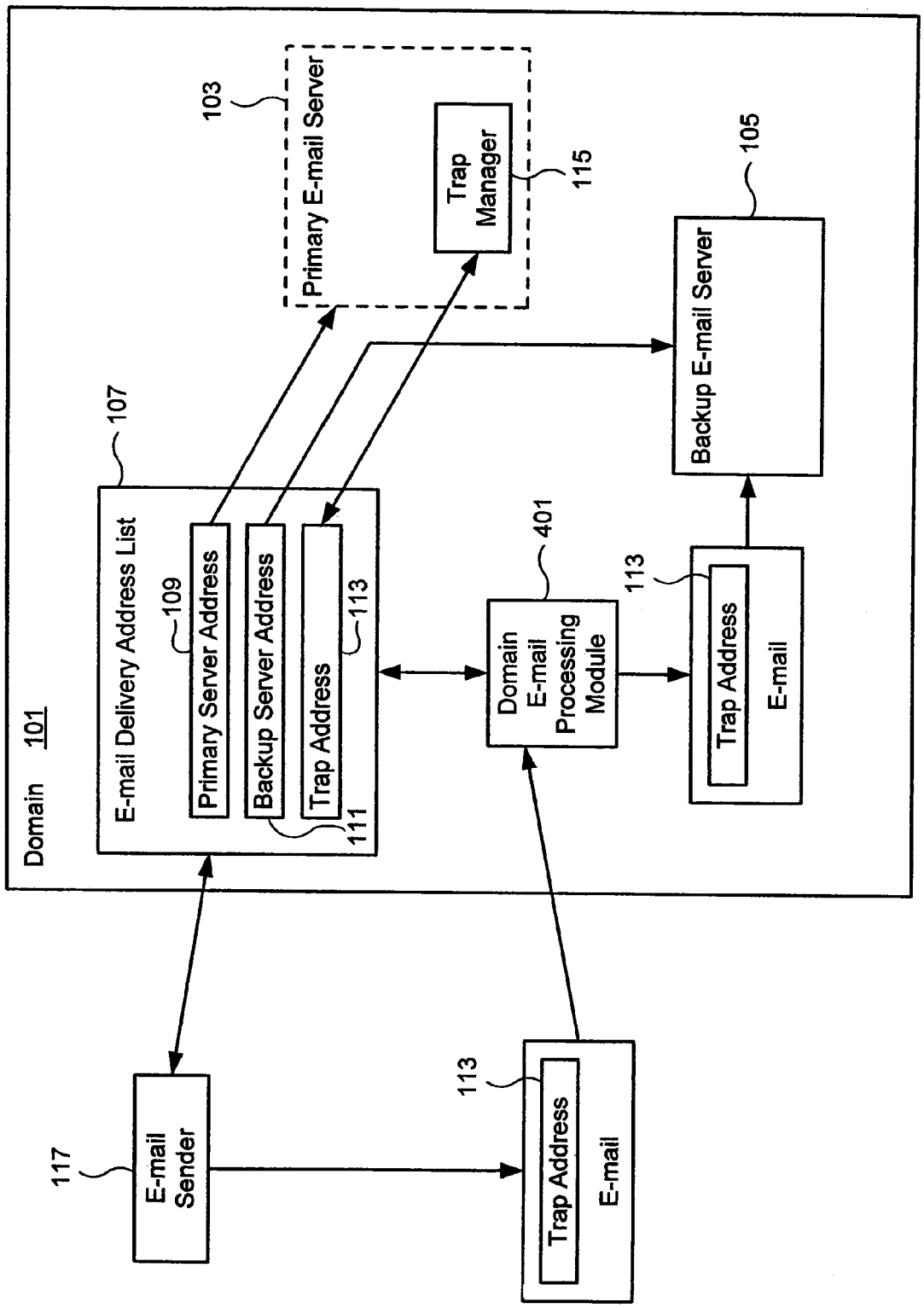
FIG. 4 is a block diagram illustrating another embodiment of the present invention.

FIG. 4 is a block diagram illustrating another embodiment of the present invention. The embodiment illustrated in FIG. 4 is similar to the embodiment illustrated in FIG. 1, but in the embodiment illustrated in FIG. 4 the primary e-mail server 103 is unreachable (e.g., it is "down"). Because in this embodiment the trap manager 115 is associated with the primary e-mail server 103, when the primary e-mail server 103 is unreachable, the trap manager 115 is also unreachable. Thus, e-mail routed to the trap address 113 is processed by standard domain e-mail processing module 401, which will route the e-mail addressed to the trap manager 115 to a backup e-mail server 105 for processing.

Figure 5:
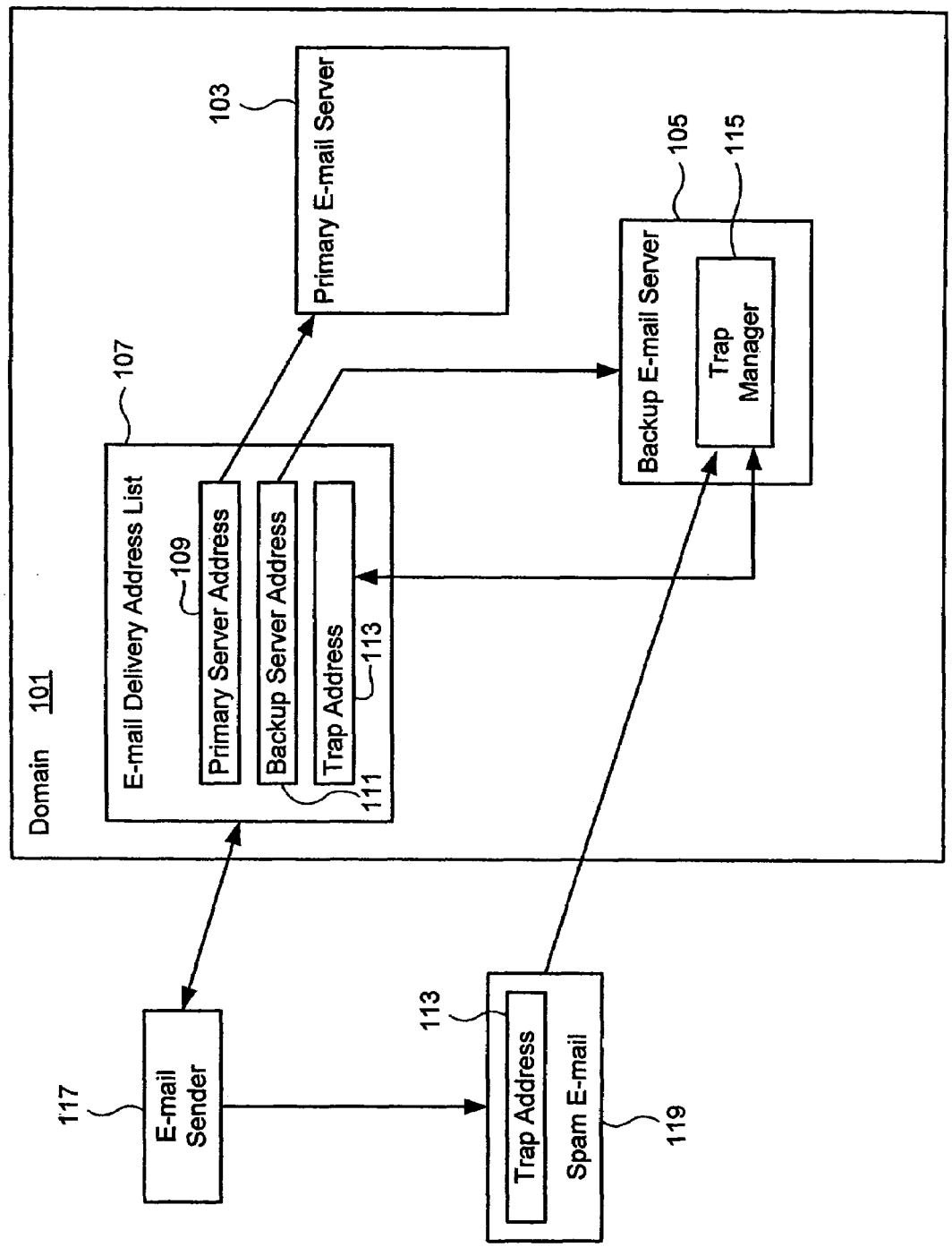
FIG. 5 is a block diagram illustrating an embodiment of the present invention in which the trap manager is associated with a backup e-mail server.
Figure 6:
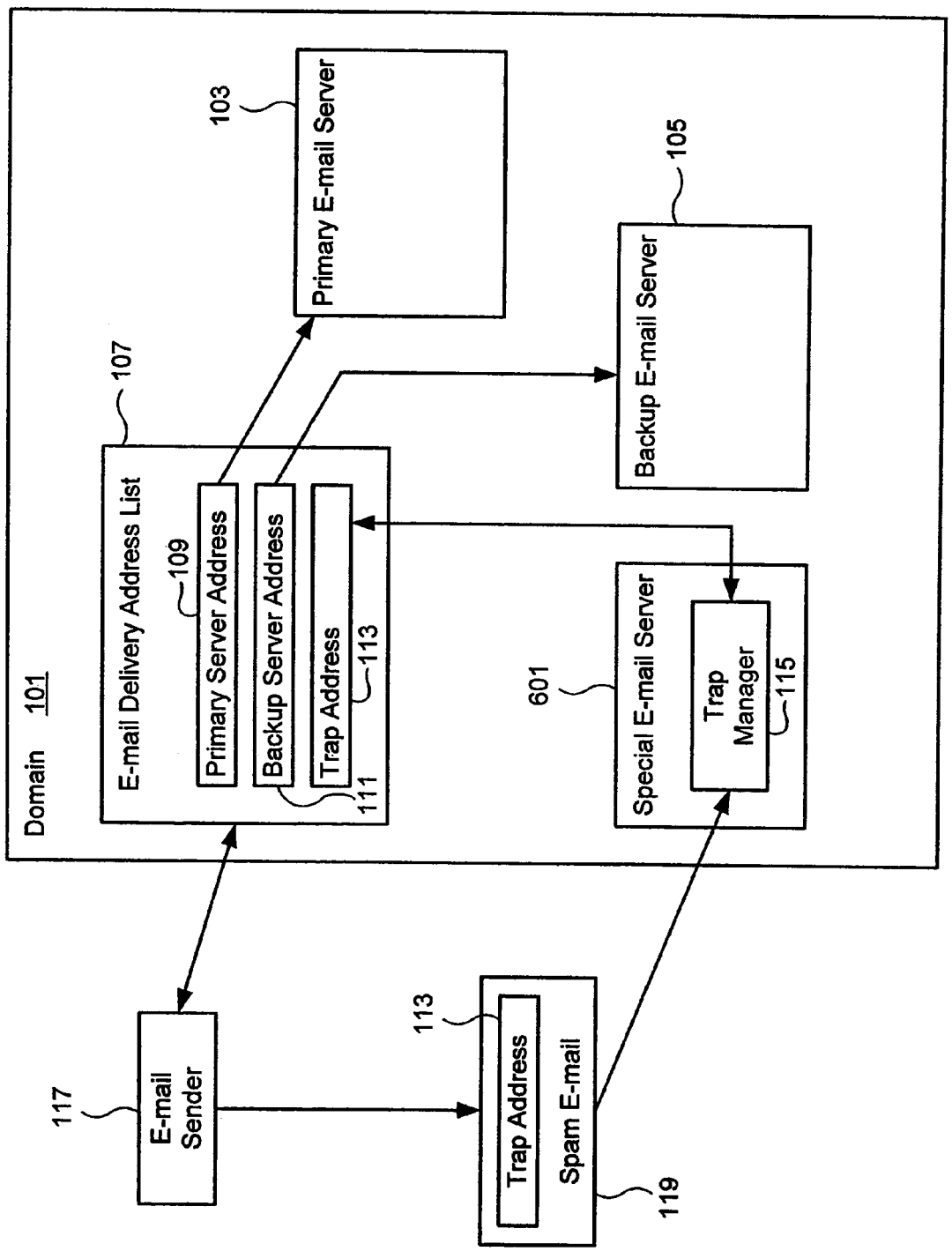
FIG. 6 is a block diagram illustrating an embodiment of the present invention in which the trap manager is implemented as a component of a special e-mail server.

As mentioned above, in some embodiments, the trap manager 115 is associated with a non-primary e-mail server. FIG. 5 illustrates an embodiment of the present invention in which the trap manager 115 is associated with a backup e-mail server 105. FIG. 5 illustrates the trap manager 115 as being a component of a backup e-mail server 105. As will be apparent to those of ordinary skill in the relevant art, in other embodiments in which the trap manager 115 is associated with a backup e-mail server 105, the trap manager 115 can be implemented in other ways, for example as a plug-in to the backup e-mail server 105, or as a transparent proxy installed in front of the backup e-mail server 105. FIG. 6 illustrates another embodiment, in which the trap manager 115 is implemented as a component of a special e-mail server 601, which is neither a primary 103 nor backup e-mail server 105, but which instead comprises an instantiation of the trap functionality of the present invention.

Figure 7:
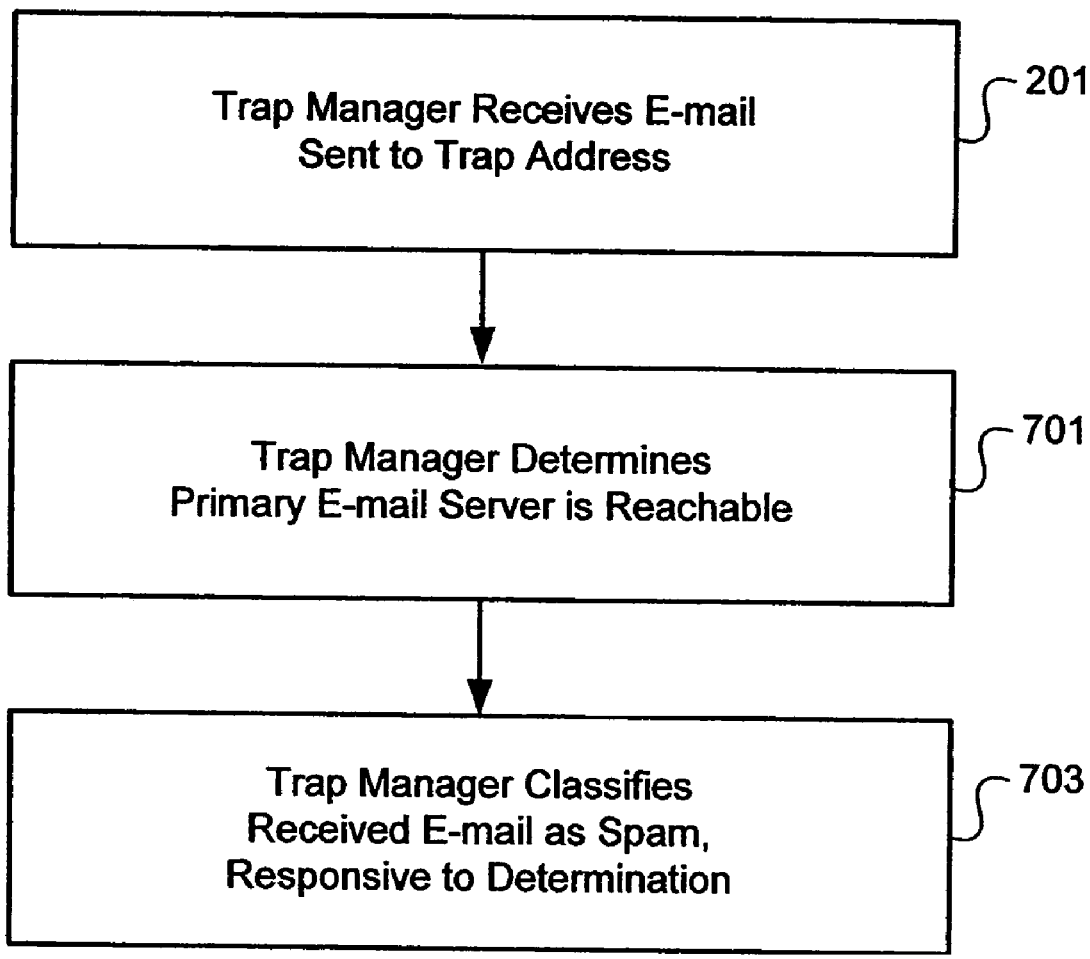
FIG. 7 is a flowchart illustrating steps for determining that received e-mail comprises spam according to one embodiment of the present invention.

FIG. 7 illustrates steps for determining that received e-mail comprises spam 119 according to some embodiments of the present invention in which the trap manager 115 is associated with a non-primary e-mail server 103. The trap manager 115 receives 201 e-mail sent to the trap address 113. The trap manager 115 proceeds to determine 701 that the primary e-mail server 103 is reachable. Recall that the trap address 113 resembles a backup e-mail server address 111, and thus e-mail received by the trap manager 115 was presumably intended for a backup e-mail server 105. If the primary e-mail server 103 is not reachable, it would be expected that legitimate e-mail would be routed to backup e-mail server addresses 111, and hence also to the trap address 113. However, if primary e-mail server is reachable, legitimate e-mail should not be routed to the trap manager 115, and thus received e-mail would be suspected as spam 119. In the embodiment illustrated in FIG. 7, the trap manager 115 classifies 703 the received e-mail as spam 119, responsive to determining 701 that the primary e-mail server 103 is reachable.

Figure 8:
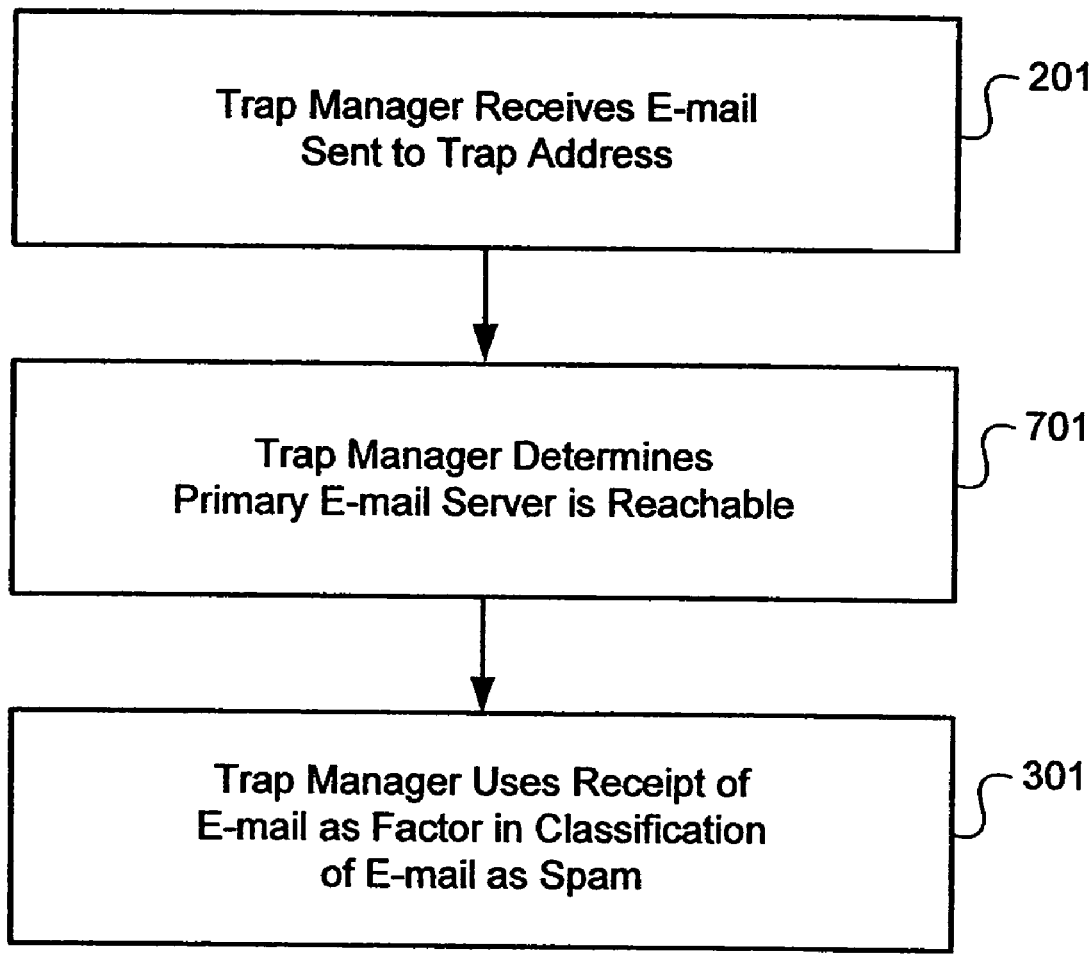
FIG. 8 is a flowchart illustrating steps for a trap manager to determine that received e-mail comprises spam, according to another embodiment of the present invention.

FIG. 8 illustrates steps for a trap manager 115 to determine that received e-mail comprises spam 119, according to another embodiment of the present invention. The trap manager 115 receives 201 e-mail sent to the trap address 113. The trap manager 115 proceeds to determine 701 that the primary e-mail server 103 is reachable. Rather than simply determining 703 that the received e-mail comprises spam 119 responsive to the determination, the trap manager 115 uses 301 the receipt of the e-mail as one factor in the classification of the e-mail as spam 119, as described above in the explanation of FIG. 3.

Figure 9:
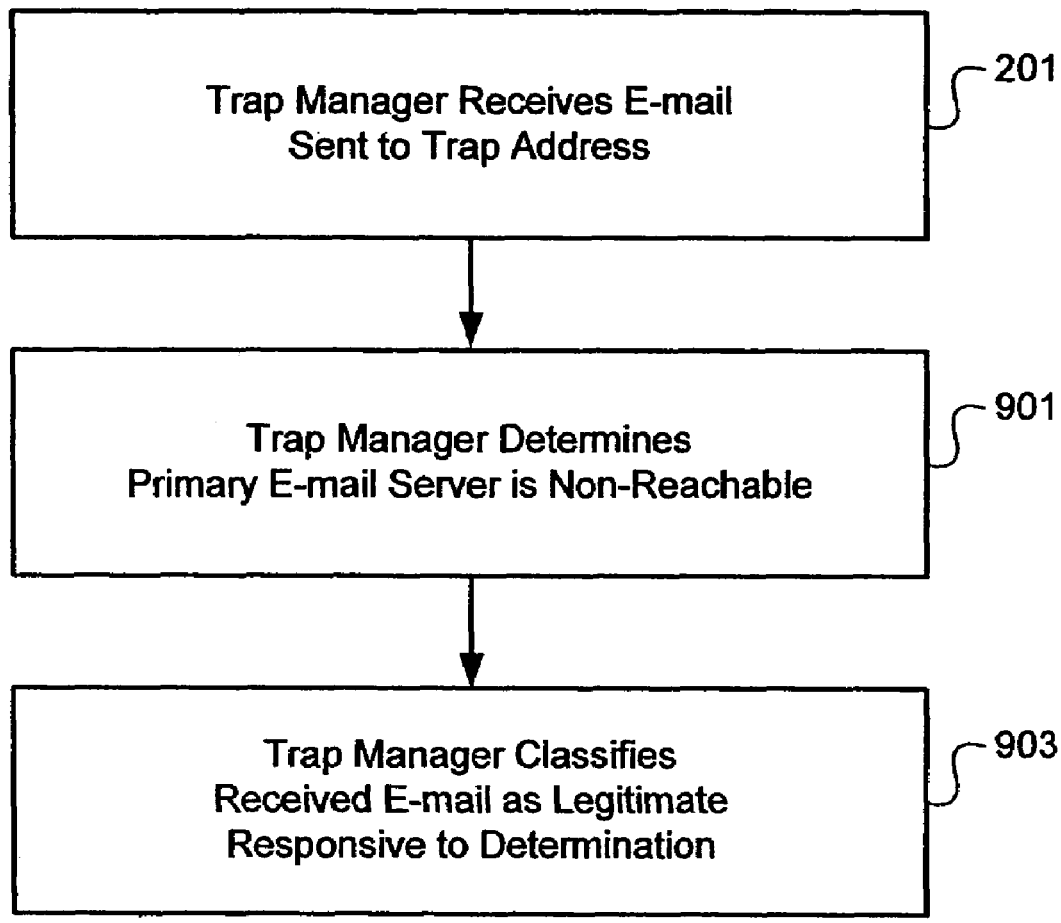
FIG. 9 is a flowchart illustrating steps for a trap manager to determine that received e-mail does not comprise spam, according to one embodiment of the present invention.

FIG. 9 illustrates steps for a trap manager 115 to determine that received e-mail does not comprise spam 119, according to one embodiment of the present invention. The trap manager 115 receives 201 e-mail sent to the trap address 113. The trap manager 115 proceeds to determine 901 that the primary e-mail server 103 is unreachable. Recall that the trap address 113 resembles a backup e-mail server address 111, and thus e-mail received by the trap manager 115 was presumably intended for a backup e-mail server 105. If the primary e-mail server 103 is not reachable, it would be expected that legitimate e-mail would be routed to backup e-mail server addresses 111, and hence also to the trap address 113. Therefore the received e-mail would not be suspected as spam. In the embodiment illustrated in FIG. 9, the trap manager 115 classifies 903 the received e-mail as legitimate, responsive to determining 901 that the primary e-mail server 103 is unreachable.

Figure 10:
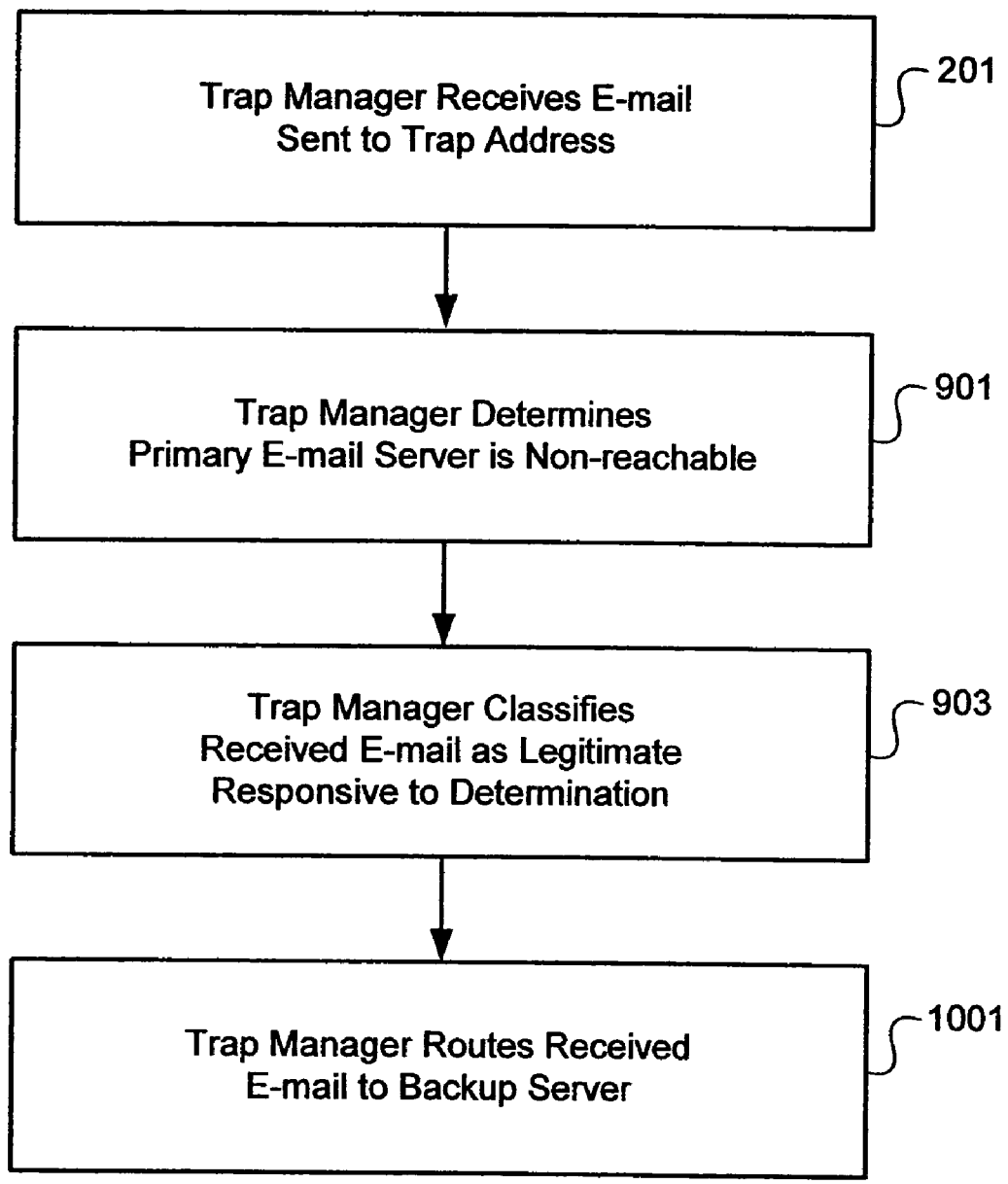
FIG. 10 is a flowchart illustrating steps for processing received e-mail that the trap manager has classified as legitimate, according to one embodiment of the present invention.
Figure 11:
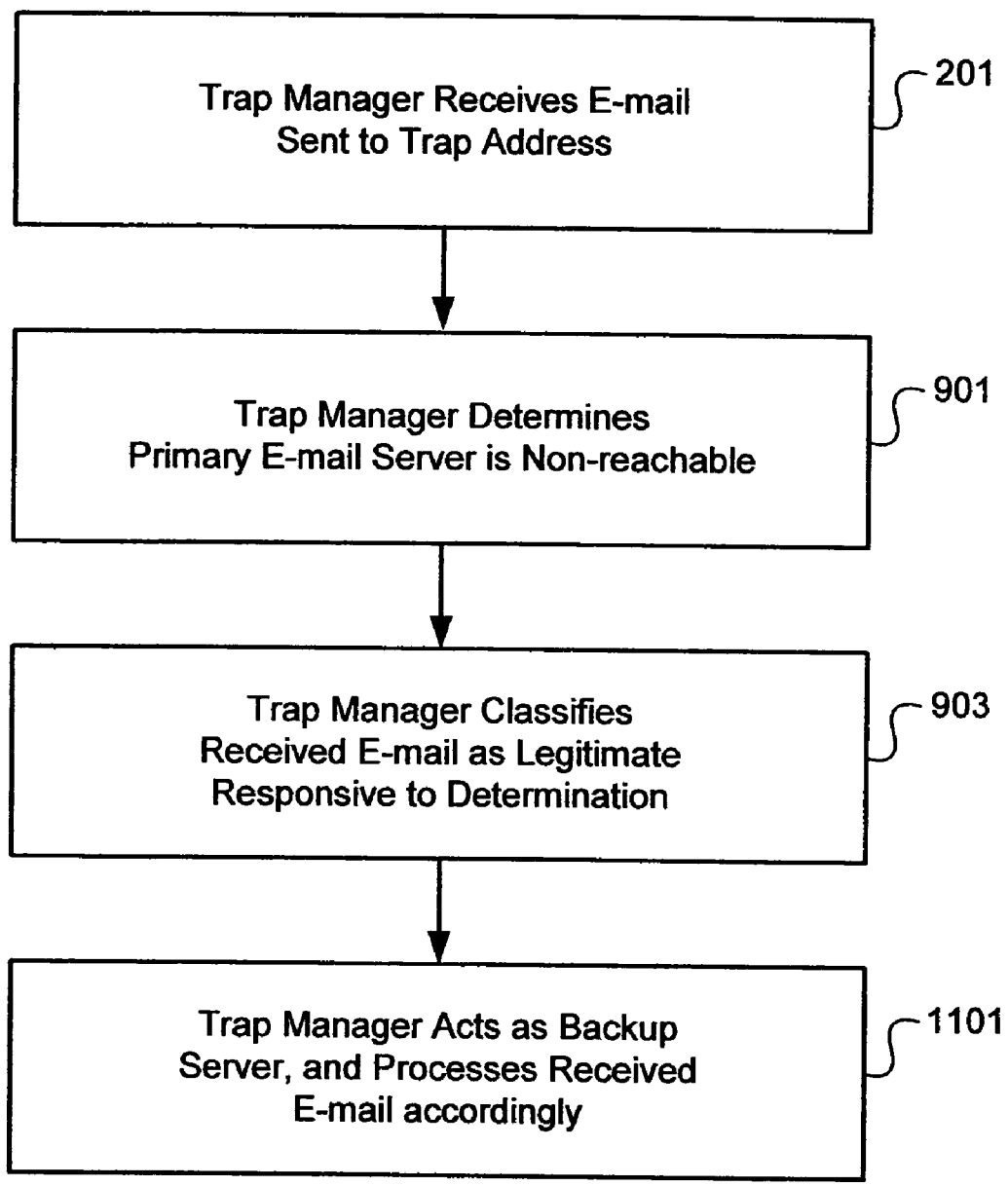
FIG. 11 is a flowchart illustrating steps for processing received e-mail that the trap manager has classified as legitimate, according to another embodiment of the present invention.

FIGS. 10 and 11 illustrate processing received e-mail that the trap manager 115 has classified 903 as legitimate as per FIG. 9, according to some embodiments of the present invention. Turning to FIG. 10, after classifying 903 the received e-mail as legitimate, the trap manager routes 1001 the received e-mail to a backup server 105 for processing. This would be desirable, for example, in embodiments such as those illustrated in FIG. 6 in which the trap manager is a component of a special e-mail server 601 which instantiates the trap functionality but does not include standard backup e-mail services. Recall that the trap manager 115 has determined 901 that the primary server 103 is not reachable, so it is appropriate for a backup e-mail server 105 to process e-mail classified 903 as legitimate.

In FIG. 11, after classifying 903 the received e-mail as legitimate, the trap manager 115 acts as a backup e-mail server 105, and processes 1101 the e-mail according to appropriate e-mail processing logic. This would be desirable, for example, in embodiments such as those illustrated in FIG. 5 in which the trap manager 115 is associated with a backup e-mail server 105.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for detecting spam e-mail received by a domain, the domain having a primary e-mail server with an e-mail delivery address, and at least one backup e-mail server with an e-mail delivery address, the method comprising the steps of:

adding at least one trap e-mail delivery address to an e-mail delivery address list associated with the domain, the trap e-mail delivery address resembling a backup e-mail server delivery address and pointing to the trap manager;

a trap manager receiving e-mail sent to the trap address;

the trap manager determining whether the primary e-mail server is reachable by an e-mail sender; and using a determination that the primary e-mail server is reachable by an e-mail sender as an indication that the received email is spam, and subsequently classifying the received email as spam.

2. The method of claim 1 wherein:

the trap manager is associated with the primary e-mail server.

3. The method of claim 2 wherein:

the trap manager comprises a transparent proxy associated with the primary e-mail server.

4. The method of claim 2 wherein:

the trap manager comprises a component of the primary e-mail server.

5. The method of claim 2 wherein:

the trap manager comprises a plug-in to the primary e-mail server.

6. The method of claim 1 wherein: the trap manager is associated with a non-primary e-mail server.

7. The method of claim 1 wherein:
the trap manager comprises a transparent proxy associated with a back-up e-mail server.

8. The method of claim 1 wherein:
the trap manager comprises a component of a back-up e-mail server.

9. The method of claim 1 wherein:
the trap manager comprises a plug-in to a back-up e-mail server.

10. The method of claim 1 wherein:
the trap manager comprises a component of a special e-mail server.

11. The method of claim 1 further comprising the step of:
the trap manager routing the received e-mail to a backup e-mail server, responsive to the determination that the primary e-mail server is unreachable by an e-mail sender.

12. The method of claim 1 further comprising the step of:
the trap manager acting as a backup e-mail server, and processing the received e-mail according to appropriate e-mail processing logic.

13. The method of claim 1 wherein:
the step of adding at least one trap e-mail delivery address to an e-mail delivery address list associated with the domain is performed by the trap manager.

14. A computer implemented method for detecting spam e-mail received by a domain, the domain having a primary e-mail server with an e-mail delivery address, and at least one backup e-mail server with an e-mail delivery address, the method comprising the steps of:
adding at least one trap e-mail delivery address to an e-mail delivery address list associated with the domain, the trap e-mail delivery address resembling a backup e-mail server delivery address and pointing to the trap manager, the trap manager being associated with the primary e-mail server;
receiving e-mail by the trap manager;
determining whether the primary e-mail server is reachable by an e-mail sender; and
classifying the received e-mail as spam, responsive to a determination that the primary e-mail server is reachable by an e-mail sender.

15. The method of claim 14 wherein:
the step of adding at least one trap e-mail delivery address to an e-mail delivery address list associated with the domain is performed by the trap manager.

16. A tangible computer readable medium containing a computer program product for detecting spam e-mail received by a domain, the domain having a primary e-mail server with an e-mail delivery address, and at least one backup e-mail server with an e-mail delivery address, the computer program product comprising:
program code to facilitate adding at least one trap e-mail delivery address to an e-mail delivery address list associated with the domain, the trap e-mail delivery address resembling a backup e-mail server delivery address and pointing to the trap manager;
program code for enabling the trap manager to receive e-mail sent to the trap address;
program code for enabling the trap manager to determine whether the primary e-mail server is reachable by an e-mail sender; and
program code for enabling the trap manager to, responsive to a determination that the primary e-mail server is unreachable by an e-mail sender, use the determination as an indication that the received email is legitimate, and subsequently classifying the received email as legitimate.

17. The tangible computer readable medium of claim 16 further comprising:
program code for enabling the trap manager to determine that received e-mail was addressed to the trap address.

18. The tangible computer readable medium of claim 16 wherein:
the trap manager is associated with a non-primary e-mail server.

19. The tangible computer readable medium of claim 16 further comprising:
program code for enabling the trap manager to use a determination that the primary e-mail server is unreachable by an e-mail sender as a factor in the classification of the received e-mail as legitimate.

20. The tangible computer readable medium of claim 19 further comprising:
program code for enabling the trap manager to act as a backup e-mail server, and processing the received e-mail according to appropriate e-mail processing logic.

21. A computer system for detecting spam e-mail received by a domain, the domain having a primary e-mail server with an e-mail delivery address, and at least one backup e-mail server with an e-mail delivery address, the computer program system comprising:
a list seeding module, stored on a tangible medium, for adding at least one trap e-mail delivery address to an e-mail delivery address list associated with the domain, the trap e-mail delivery address resembling a backup e-mail server delivery address and pointing to a trap manager;
a reception module, stored on a tangible medium, for receiving e-mail sent to the trap address, the reception module being communicatively coupled to the list seeding module; and
a determination module, stored on a tangible medium, for determining whether the primary e-mail server is reachable by an e-mail sender, using a determination that the primary e-mail server is reachable by an e-mail sender as an indication that the e-mail sent to the trap address is spam, and subsequently classifying the received email as spam, the determination module being communicatively coupled to the reception module.

22. The computer system of claim 21 wherein:
the determination module is further adapted to determine whether received e-mail was addressed to the trap address.

* * * * *